(12) United States Patent
Kahlman

(10) Patent No.: US 6,272,102 B1
(45) Date of Patent: Aug. 7, 2001

(54) AMPLITUDE DETECTOR FOR SIGNALS HAVING A PERIODICAL CHARACTER, RECORDED ON A RECORDING MEDIUM, AND OPTICAL TAPE RECORDER COMPRISING SUCH AN AMPLITUDE DETECTOR

(75) Inventor: Josephus A. H. M. Kahlman, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/198,044

(22) Filed: Nov. 23, 1998

(30) Foreign Application Priority Data

Nov. 29, 1997 (EP) .................................................. 97203742

(51) Int. Cl.$^7$ ....................................................... G11B 7/00
(52) U.S. Cl. ............................... 369/124.01; 369/124.05; 369/124.15
(58) Field of Search ................................ 369/13, 124.01, 369/59.17, 44.25, 124.05, 124.14, 124.15; 348/571; 360/48, 46; 702/66

(56) References Cited

U.S. PATENT DOCUMENTS 5,448,309 * 9/1995 Won ...................................... 348/607
5,581,534 * 12/1996 Van Rosmalen et al. ........... 369/112
5,629,914 * 5/1997 Clark et al. ............................... 369/59
5,659,535 * 8/1997 Kimura et al. ........................ 369/124

OTHER PUBLICATIONS

Optical Tape System; Evaluation of Recorder and Media, G.W.R. Leibrandt, J.A.H. Kahlman, G.E. Van Rosmalen and JJ. Vrehen, SPIE Proceedings Series, vol. 3109, pp. 1–9.

* cited by examiner

*Primary Examiner*—Thang V. Tran
*Assistant Examiner*—Kim-Kwok Chu
(74) *Attorney, Agent, or Firm*—Michael E. Belk

(57) ABSTRACT

An amplitude detector for signals having a periodical character, recorded on a recording medium, including a first delay line and a second delay line, wherein an average maximum value of the detected signal is stored in the first delay line for each one of a predetermined number of detection instants within a detection period, and an average minimum value of the detected signal is stored in the second delay line for each one of the detection instants, means for determining an average level between the average maximum and minimum values for each detection instant on the basis of the output signals of the two delay lines, and means for comparing the current signal to be detected for a given detection instant with the average level for the detection instant so as to provide a detection signal.

10 Claims, 3 Drawing Sheets

AMPLITUDE DETECTOR FOR SIGNALS HAVING A PERIODICAL CHARACTER, RECORDED ON A RECORDING MEDIUM, AND OPTICAL TAPE RECORDER COMPRISING SUCH AN AMPLITUDE DETECTOR

FIELD OF THE INVENTION

The invention relates to an amplitude detector for signals having a periodical character, recorded on a recording medium. More particularly, the invention relates to an amplitude detector for use in an optical tape recorder.

BACKGROUND OF THE INVENTION

In optical tape recorders of the type described in the article "Optical Tape System; evaluation of recorder and media" by G. W. R. Leibbrandt, J. A. H. Kahlman, G. E. van Rosmalen and J. J. Vrehen in SPIE Proceedings Series, vol. 3109, use is made of a rotating polygon mirror, for example a polygon having 10 facets, which images a laser beam directed onto the polygon via an objective on an optical tape. The plane of the polygon mirror is substantially perpendicular to the travel direction of the tape, and the information is recorded in narrow, parallel tracks on the tape. In the longitudinal direction of a tape having a width of, for example 12.7 mm, for example, 12 tracks of 1 mm may be present. Each track consists of parallel sub-tracks located transversely to the longitudinal direction of the track, and each sub-track is recorded during the rotation of one facet of the polygon mirror by the laser beam, and the next, juxtaposed sub-track is recorded during the rotation of the next mirror facet by the laser beam.

For example, 1500 bits can be recorded on each sub-track by modifying the surface of the tape by means of the laser beam, for example by forming pits on this tape in a way which is comparable with the method used for a compact disc. When reading the pits by means of the same laser beam, these pits have different reflection properties than the interposed areas, and the signal recorded on the tape can be derived from this information.

The above citations are hereby incorporated in whole by reference.

SUMMARY OF THE INVENTION

Large amplitude variations occur in the signal of a sub-track read by means of the laser beam. Moreover, the signal drops out completely for a short time during the transition to the next sub-track, every time after a limited number of, for example 1500 bits. FIG. 1 shows an example of a read signal which corresponds to a signal recorded on 1.5 sub-tracks of a track. For such a read signal with a periodical character, it is difficult to detect the zero crossings in the signal by means of known amplitude detectors.

In a known amplitude detector consisting of a high-pass filter and a zero detector (slicer), the time constant of the high-pass filter is determined by the frequency of the amplitude variations of the read signal, which variations may be only several dozens of bits for optical tape recording because otherwise the amplitude variations cannot be followed sufficiently. To make this possible, the coding used for the recorded signal should be DC-free for a large part of the maximum bit frequency. This is possible but it is at the expense of the recording density of the signal, which is undesirable.

Also an amplitude detector in which the detection threshold is fixed halfway between the maximum and minimum signal level in known manner, is not very well usable in this specific case. In fact, for such an amplitude detector it is necessary to make use of peak detectors having a sufficiently small time constant to follow the signal variations, but this time constant should not be too small in order that there is not too much signal decay between consecutive signal pits in the tape. However, such peak detectors are very sensitive to disturbances such as noise, drop-outs, etc., while existing RF peak detectors are neither sufficiently accurate for use with signals of the type described.

It is an object of the invention to provide an amplitude detector which does not have the afore-mentioned drawbacks and, more particularly, is sufficiently accurate, fairly insensitive to disturbances and usable for read signals of different code formats.

To this end, the invention provides an amplitude detector for signals having a periodical character, recorded on a recording medium, and is characterized by a first delay line and a second delay line, wherein an average maximum value of the detected signal is stored in the first delay line for each one of a predetermined number of detection instants within a detection period, and an average minimum value of the detected signal is stored in the second delay line for each one of said detection instants, means for determining the average level between the average maximum and minimum values for each detection instant on the basis of the output signals of the two delay lines, and means for comparing the current signal to be detected for a given detection instant with the average level for said detection instant so as to provide a detection signal.

The invention is based on the recognition that in, for example, an optical tape recorder of the type described, the amplitude of the read signal changes only slowly with respect to time at corresponding positions in sub-tracks. There is a strong correlation between the signal amplitude and the rotation frequency of the polygon mirror. This is caused by deviations in the optical system, such as lens errors and reflection variations on the polygon and by the mutual inaccuracy of the polygon facets.

In accordance with a first aspect of the invention, the average maximum and average minimum values of the read signal are determined by means of two peak detector/memory loop combinations for each one of a number of positions of the polygon mirror, for example 256 positions for a mirror with 10 facets. The decision level for each position is subsequently chosen to be halfway between these two levels. The length of the memory loop corresponds to the rotation frequency of the polygon mirror so that two peak detectors are provided for each one of the, for example 256 positions of the mirror, and means are provided for determining the decision level for each position from the output signals of these detectors.

In accordance with a second aspect of the invention, means are provided which can detect also rapid variations of the amplitude of the read signal, hence rapid amplitude variations of the data which have been read and can adapt the decision level accordingly. Such rapid variations may occur, for example in the case of tracking errors and when switching on the recorder.

The invention also relates to an optical tape recorder comprising an amplitude detector as claimed in claims 1 to 8.

Those skilled in the art will understand the invention and additional objects and advantages of the invention by studying the description of preferred embodiments below with reference to the following drawings which illustrate the features of the appended claims.

DETAILED DESCRIPTION OF THE PREFERRED EMBODIMENTS

Figure 1:
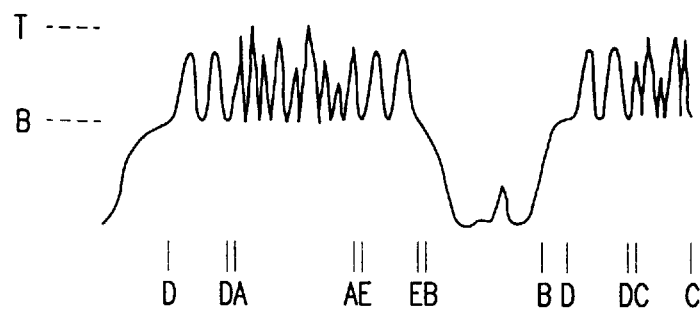
FIG. 1 shows an example of the read signal of a sub-track on an optical tape.

FIG. 1 shows a typical example of a read signal of an optical tape. The part A—A relates to the signal which is read from a complete sub-track; the part B—B is the signal during the transition to a juxtaposed sub-track, and the part C—C is a part of the read signal of the first half of this subsequent sub-track. The level B(ottom) in the Figure is determined, during reading of a track, by the reflection properties of the tape and twice the transmission via the objective with which the laser beam is imaged via the polygon mirror on the tape and the reflected beam is subsequently detected. The minimum signal levels of the data recorded on the tape are at the B level. The maximum levels of the data are at the T(op) level.

Figure 2:
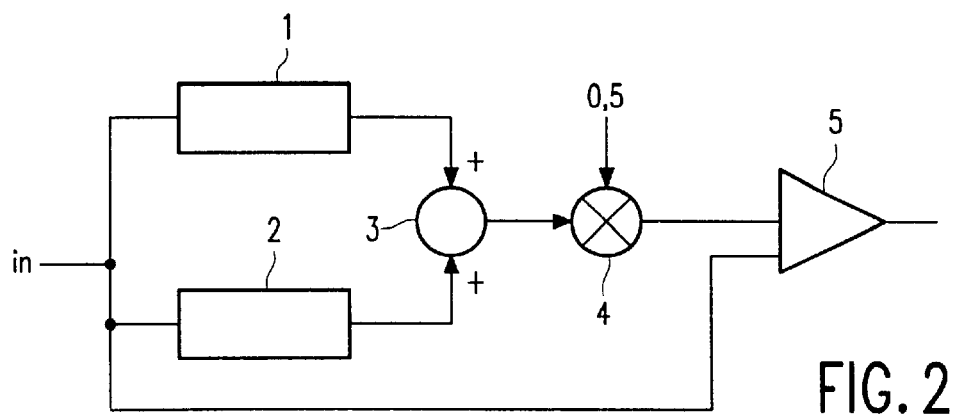
FIG. 2 is a circuit diagram of the amplitude detector according to the invention.

FIG. 2 is the circuit diagram of an amplitude detector according to the invention. It comprises two memory loops 1 and 2, a summing circuit 3, a multiplier 4 and a zero detector (slicer) 5.

The signal which is received by a laser detection unit and may have the shape as shown in FIG. 1 is applied to the inputs of the memory loops 1 and 2, respectively. In memory loop 1, the average value of the maximum signal level is fixed for each one of a plurality of, for example 256, positions of the polygon mirror in a manner to be further described with reference to FIG. 3. In memory loop 2, the average minimum signal value is fixed in a corresponding manner for each of these 256 positions. The outputs of the two memory loops provide the average maximum level $T_{gem}$ during each clock period and the average minimum level $B_{gem}$ for one and the same position of the polygon mirror. These two values $T_{gem}$ and $B_{gem}$ are summed in the summing circuit 3 and subsequently multiplied by 0.5 in the multiplier so that a decision level of $(T_{gem}+B_{gem})/2$ is obtained, which is the average decision level for this specific position of the polygon mirror. In the slicer 5, the current data signal is compared with this decision level and it is determined whether the bit which has been read is a 1 or a 0. The desired data signal is then available at the output of the slicer.

Figure 3:
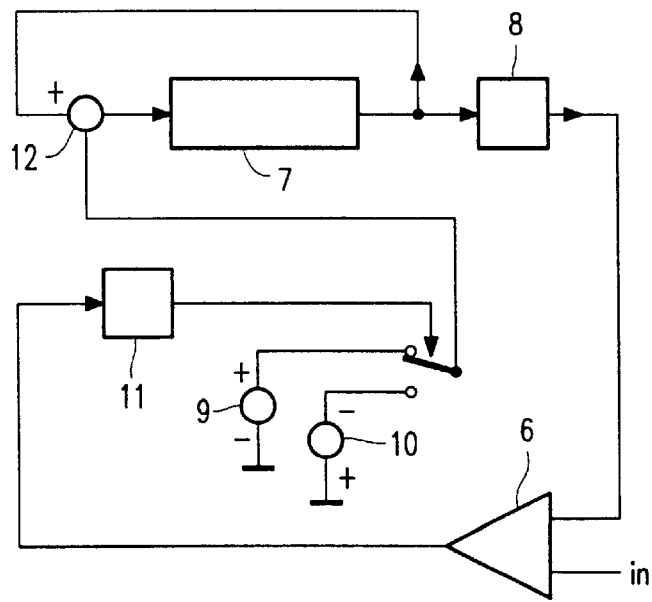
FIG. 3 is a block diagram of a memory loop for the embodiment of FIG. 2.

FIG. 3 shows in greater detail an example of a memory loop 1, for the maximum value, as can be used in FIG. 1. The memory loop 2 for the minimum value has, mutatis mutandis (i.e. similarly with the obviously necessary changes in details), the same structure. The memory loop 1 comprises a slicer 6, an input of which receives the output read signal from the laser detection unit. Furthermore, a delay line 7 having, for example 256 memory sites is provided. By means of an external clock signal, it is ensured in known manner that a signal relating to exactly the same one of the 256 positions of the polygon mirror as the signal present at that instant at the other input of the slicer is available at the output of the delay line 7. This output signal of the delay line, which is representative of the average maximum value of the signal level for the relevant polygon position, is applied to the second input of the slicer 6 via a DIA converter 8.

To ensure that the signal level in each one of the 256 memory sites (locations) of the delay line 7 indeed corresponds to the average maximum level for a specific position of the polygon mirror, the memory loop further comprises two correction signal sources 9 and 10, a switching unit 11 and a summing circuit 12. The output signal from the slicer 6 controls the switching unit 11 in such a way that, if the output read signal level at the first input of the slicer is larger than the signal from the delay line at the second input, the correction signal source 9 supplying a positive voltage at a predetermined fixed amplitude $U_{incr}$ is connected via the switching unit to the summing circuit 12, the second input of which receives the output signals from the delay line 7 and the output of which is connected to the input of the delay line 7. In this way, the average maximum signal level is slightly increased for a specific position of the polygon mirror when the amplitude of the current read signal is found to be larger than the stored average amplitude.

In a corresponding manner, the switching unit is controlled in such a way that the correction signal source 10 supplying a negative voltage at a predetermined amplitude $U_{decr}$ is connected to the summing circuit 11 if the average signal level presented to the second input of the slicer is higher than the current signal level. In this way, the average maximum amplitude stored for a polygon position in the delay line 7 is slightly decreased.

In the manner described above, the signal level stored in the delay line 7 for each polygon position can gradually follow the current variation of the maximum signal amplitudes that have been read.

In the case of the memory loop 1 for the average maximum value, it holds that $U_{incr} \gg U_{decr}$ so as to ensure that an increase of the maximum value is followed more rapidly than a decrease. Similarly it holds for the memory loop 2 for the average negative value that $U_{decr} \gg U_{incr}$ so as to be able to follow a decrease of the minimum value more rapidly than an increase.

Instead of fixed values for $U_{incr}$ and/or $U_{decr}$, it is alternatively possible to render these values dependent on the actual signal amplitude by rendering, for example, $U_{incr}$ and/or $U_{decr}$ equal to a fixed fraction of this signal amplitude.

According to the invention, the amplitude detector may be further provided with a refinement providing the possibility of suppressing the disturbing influence of regular bit patterns such as the sync word, at fixed positions in the sub-track. Such bit patterns as are shown diagrammatically, for example, in FIG. 1 at D—D and E—E, may have the result that the average maximum and minimum amplitudes follow these bit patterns accurately and that, consequently, these bit patterns are not correctly detected.

Figure 4:
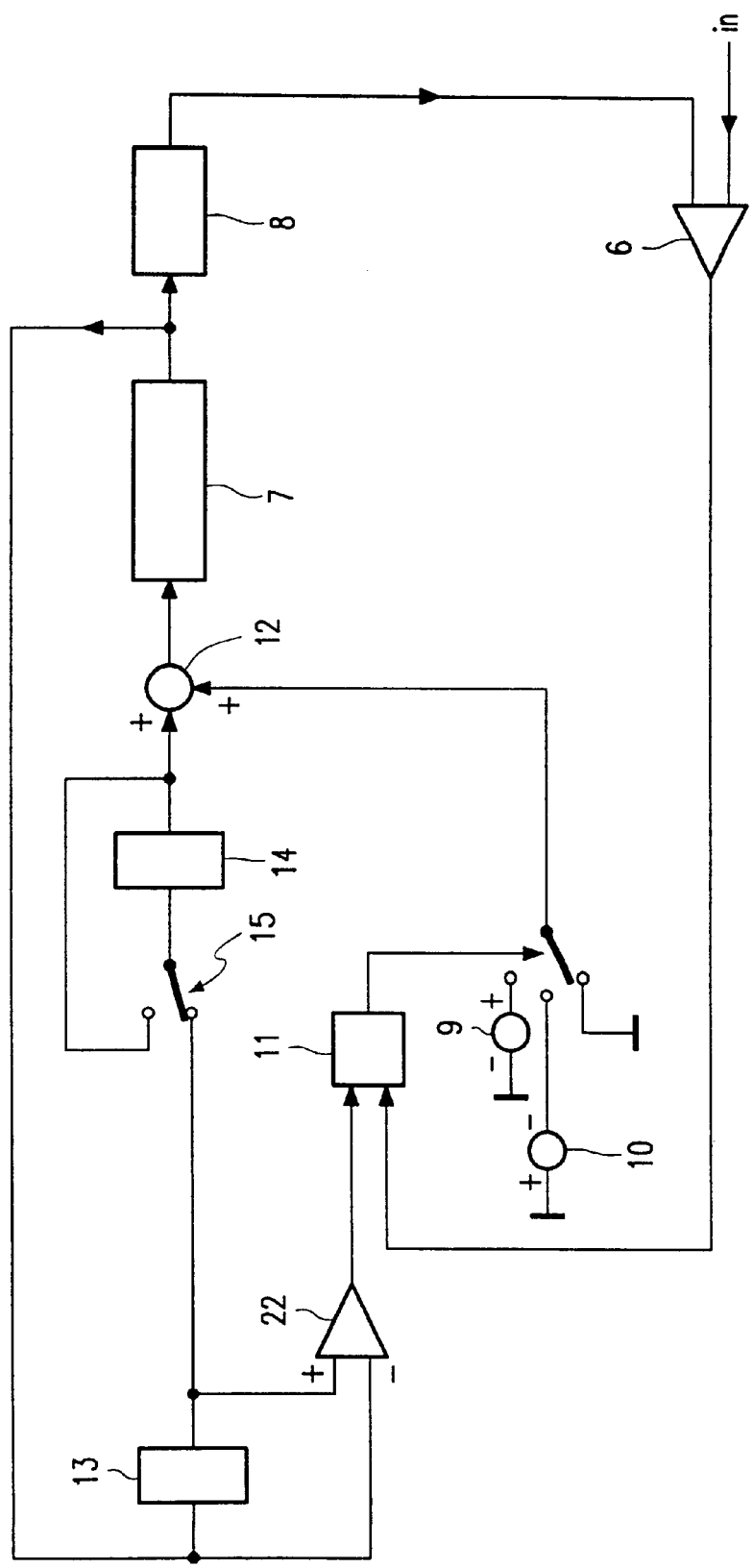
FIG. 4 shows a second embodiment of the memory loop of FIG. 2.

FIG. 4 is a block diagram of a circuit in which this disturbing influence can be suppressed. The components in the block diagram, which are identical to those in the block diagram of FIG. 3, have reference numerals which are identical to those in FIG. 3. The extension of the circuit in FIG. 3 comprises a second slicer 22, a first register 13, a second register 14 and a controllable switch 15.

If average signal values are stored for 256 polygon positions, the delay line 7 now has 254 memory sites and the registers 13 and 14 each fulfil the function of one memory site.

In the slicer 22, the average maximum amplitude value for the current polygon position is compared with the value of the previous polygon position at the output of register 13. The slicer 22 supplies an output signal when the amplitude for the previous polygon position is higher than the amplitude for the current polygon position, because this may be an indication that a decreasing signal edge in the area D–D or E–E has been reached. the switching unit 11 is arranged in such a way that the output signal of slicer 22 has priority with respect to that of slicer 6. If the switching unit 11 receives the output signal from slicer 22, the switching unit connects a correction signal source having a fixed amplitude $U_{dec}=0$ or a value $U_{dec}<<U_{decr}$ to the input of the summing circuit 12. When slicer 22 controls the switching unit 11, switch 15 is switched in such a way that the output of register 14 is connected to its input. Consequently, the last maximum value is retained and an unwanted decrease of the average maximum signal level upon the occurrence of, for example a sync pattern is prevented.

Figure 5A:
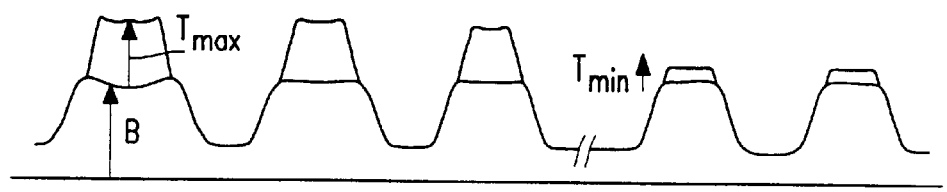
FIGS. 5a,b show a third embodiment of the amplitude detector according to the invention.

FIGS. 5a,b show a variant of the circuit which allows detection of rapid changes of the data signal amplitude and rapid creation of an adapted decision level.

FIG. 5a shows diagrammatically a signal, similarly as in FIG. 1, with a data signal having a relatively large amplitude during reading of a series of sub-tracks and a relatively small amplitude during reading of a subsequent series of sub-tracks, respectively. Such a situation may occur when the recorder is switched on or when there are tracking problems. In the Figures, the levels B(ottom) and T(op) are indicated, with $T_{max}$ and $T_{min}$ at the maximum and the minimum amplitude, respectively. In any case, the data signal is a signal having an average value of 0 in this embodiment. Due to the presence of an integrator 18, the circuit of FIG. 5b provides the possibility of rapidly reaching a correct decision level, also in a situation with signals as shown in FIG. 5a.

Figure 5B:
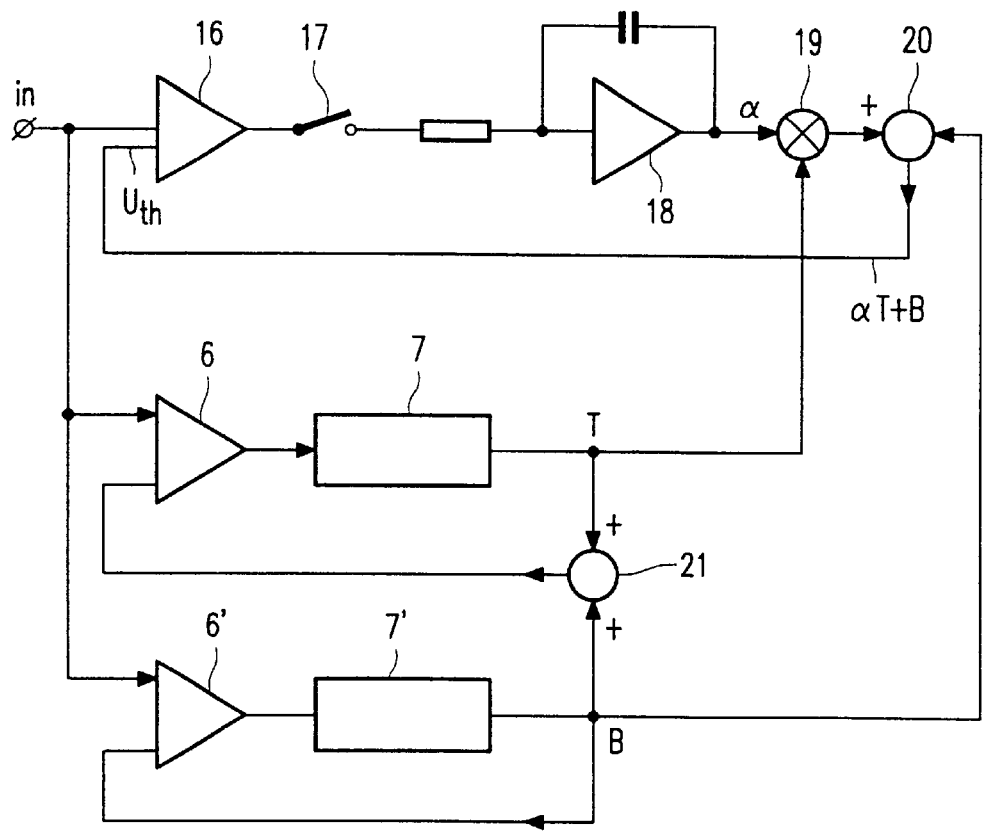

In FIG. 5b, components which are identical to those in FIGS. 2 and 3 have the same reference numerals. The slicers 6, 6' correspond to the slicer 6 of FIGS. 3, 4 for the memory loop for the average maximum. The delay lines 7, 7' correspond to the delay line 7 of FIGS. 3, 4. For each polygon position, the delay line 7 provides a signal T(op) which is representative of the average T(op) value for this position. Similarly, the delay line 7' provides a signal B(ottom) which is representative of the average minimum value. Furthermore, there is a third slicer 16, a controllable switch 17, the integrator 18, a multiplier 19 and summing circuits 20 and 21.

The slicer 16 compares the current data signal with a threshold value $U_{th}$ to be further described. The output signal from the slicer is a bivalent signal having the values of –1 and +1. If the data signal has a larger amplitude than $U_{th}$, the output of the slicer supplies the detected data signal and, if switch 17 is closed, also applies a signal to the input of the integrator 18. The output signal from this integrator is a signal a which is larger than 0 and is the average value of the data signal. In the multiplier 19, the signal α is multiplied by the signal T, and subsequently, the signal αT is added to the signal B in the summing circuit 20. The output signal from the summing circuit 20 is thus equal to αT+B and this signal is applied as threshold voltage $U_{th}$ to the second input of the slicer 16. The circuit of FIG. 5 is capable of following amplitude variations of the type shown in FIG. 5a very rapidly, because the circuit consisting of the slicer 16, the integrator 18, the multiplier 19 and the summing circuit 20 can react much more rapidly than the circuit consisting of the slicer 6 and the memory loop 7 and the circuit consisting of the slicer 6' and the memory loop 7', respectively. The switch 17 is controlled in such a way that it is only closed during the periods when a sub-track is actually being read, hence, for example during the period A—A or C—C. It is thereby prevented that the decision level is influenced by the signal decrease during the period B—B. If there is no asymmetry in the signal and no strong amplitude fluctuations due to, for example transient phenomena or tracking errors, it holds that a α=0.5 and the decision level is equal to B+0.5T, which corresponds to the decision level determined in the circuit shown in FIGS. 3 and 4. However, at strong amplitude fluctuations, α changes rapidly with such fluctuations and the decision level is rapidly adapted.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims:

What is claimed is:

1. A detector comprising:

first and second delay lines, each delaying the output of a stored value for a predetermined detection period;

means for storing an average value of the maximum value of a detected signal during a detection instant in the first delay line in a different location for each of a predetermined number of detection instants within the detection period, the average being for the same instant in the detection period over multiple detection periods;

means for storing an average value of the minimum value of the detected signal in the second delay line in a different location for each detection instants, the average being for the same instant in the detection period over multiple detection periods;

means for determining an average level between the average maximum and minimum values for each detection instant depending on the output signals of the two delay lines; and means for comparing a detected signal for a detection instant with the average level for the detection instant so as to provide a detection signal.

2. The detector of claim 1, in which the average level is determined by multiplying by half the sum of the average maximum value and the average minimum value.

3. The detector of claim 1, in which:

the average signal level depends on a fraction of the average maximum signal value for and the average minimum signal value; and the detector further comprises integrator means for determining the fraction by integrating the detection signal.

4. The detector of claim 1, in which the first and the second delay lines each include means for adjusting the stored average maximum or minimum value for a detection instant if the maximum or minimum value of the detection signal for the detection instant deviates from the average maximum or minimum value for the detection instant.

5. The detector of claim 4, in which the adjusting means ensure a larger adjustment for an increase of the maximum and a decrease of the minimum, respectively, than for a decrease of the maximum and an increase of the minimum.

6. The detector of claim 4, in which the adjusting means prevent or reduce the adjustment of the average maximum or minimum value if there is a continuous decrease or increase in the maximum or minimum value of the detection signal in sequential detection instants in the detection period.

7. The detector of claim 1, in which the detected signal has a periodical characteristic and is the read signal of an optical tape.

8. The detector of claim 7, wherein the read signal is obtained using a polygon mirror having a plurality of facets, in which a plurality of detection instants is stored in the delay lines for each facet.

9. An optical tape reproducer comprising:

means for reading signals having a periodical characteristic from an optical tape;

an amplitude detector for the periodical signals, including:

first and second delay lines, each delaying the output of a stored value for a predetermined detection period;

means for storing an average value of the maximum value of a detected signal during a detection instant in the first delay line in a different location for each of a predetermined number of detection instants within the detection period, the average being for the same instant in the detection period over multiple detection periods;

means for storing an average value of the minimum value of the detected signal in the second delay line in a different location for each detection instants, the average being for the same instant in the detection period over multiple detection periods;

means for determining an average level between the average maximum and minimum values for each detection instant depending on the output signals of the two delay lines; and means for comparing a detected signal for a detection instant with the average level for the detection instant so as to provide a detection signal.

10. The reproducer of claim 9, in which:

the average level is determined by multiplying by half the sum of the average maximum value and the average minimum value;

the average signal level depends on a fraction of the average maximum value and the average minimum signal value;

the detector further comprises integrator means for determining the fraction by integration of the detection signal;

the first and second delay lines each include means for adjusting the average maximum or minimum value for the detection instant if the maximum or minimum value of the detection signal deviates from the average maximum or minimum value for the detection instant;

the adjusting means ensure a larger adjustment for an increase of the maximum and a decrease of the minimum, respectively, than for a decrease of the maximum and an increase of the minimum;

the adjusting means prevent or reduce the adjustment of the average maximum or minimum level if there is a continuous decrease or increase in the detection period in the maximum or minimum value of the detection signal in sequential detection instants in the detection period; and the reading means includes a polygon mirror having a plurality of facets, in which a plurality of detection instants is stored in the delay lines for each facet.

\* \* \* \* \*